US012494626B2

(12) United States Patent
Wang

(10) Patent No.: US 12,494,626 B2
(45) Date of Patent: Dec. 9, 2025

(54) OUTDOOR POWER SUPPLY BOX WITH GOOD WATERPROOF EFFECT

(71) Applicant: Yueqing Shenchuang Electric Technology Co., Ltd., Yueqing (CN)

(72) Inventor: Guangqiang Wang, Yueqing (CN)

(73) Assignee: Yueqing Shenchuang Electric Technology Co., Ltd., Yueqing (CN)

( * ) Notice: Subject to any disclaimer, the term of this patent is extended or adjusted under 35 U.S.C. 154(b) by 197 days.

(21) Appl. No.: 18/474,890

(22) Filed: Sep. 26, 2023

(65) Prior Publication Data
US 2025/0070539 A1  Feb. 27, 2025

(30) Foreign Application Priority Data

Aug. 21, 2023 (CN) .......................... 202311051737.1

(51) Int. Cl.
*H02G 3/08* (2006.01)
(52) U.S. Cl.
CPC ............. *H02G 3/088* (2013.01); *H02G 3/081* (2013.01)
(58) Field of Classification Search
CPC ...... H02G 3/088; H02G 3/081; H05K 5/0217; H05K 5/03; H05K 5/06; Y02A 30/14
USPC ........................................................ 174/50.54
See application file for complete search history.

(56) References Cited

U.S. PATENT DOCUMENTS

2009/0255703 A1 * 10/2009 Vigorito ................. H02G 3/081
174/67

* cited by examiner

*Primary Examiner* — Timothy J Thompson
*Assistant Examiner* — Michael F McAllister
(74) *Attorney, Agent, or Firm* — Westbridge IP LLC

(57) ABSTRACT

An outdoor power box includes a housing and a detachable waterproof component on the front side of the housing for cable connection. The housing includes a base box and a rotatable cover that fully encloses it. Both have arc-shaped slots, forming a cavity for wire accommodation. The walls of the slots are provided with at least one groove. The waterproof component includes a rigid first casing, a second casing, a first waterproof sleeve, and a second waterproof sleeve. The first casing and the second casing are equipped with clasps that cooperate with the grooves, and the first casing is installed on the cover by clasping, while the second casing is installed on the base box by clasping. The power box only has slots and channels, ensuring a good overall sealing effect. Waterproof components and plugs greatly enhance the waterproof performance and ensure reliable sealing when used outdoors.

18 Claims, 6 Drawing Sheets

OUTDOOR POWER SUPPLY BOX WITH GOOD WATERPROOF EFFECT

CROSS-REFERENCE TO RELATED APPLICATIONS

This application claims priority to Chinese Patent Application No. 202311051737.1, filed on Aug. 21, 2023, the content of which is incorporated herein by reference in its entirety.

TECHNICAL FIELD

The present application relates to the field of power supply boxes and specifically relates to an outdoor power supply box with good waterproof effect.

BACKGROUND

In the existing technology, there is a large gap between the outdoor power supply box and the cable connection, resulting in poor waterproofing. During usage, the power supply box easily accumulates debris such as leaves and insect remains, thereby affecting its normal operation. This inconvenience is highly undesirable.

SUMMARY

To address the aforementioned issues, the present application proposes an outdoor power supply box with a simple structure, excellent waterproof effect, and good sealing performance.

The outdoor power supply box with good waterproof effect according to the present application includes a housing and a detachable waterproof component installed on the front side of the housing for connecting cables. The housing comprises a base box and a cover that is rotatably mounted on the top of the base box, fully enclosing it. The base box and the cover on the front side are provided with arc-shaped slotted compartments for accommodating wires. At least one connecting groove is formed on the groove wall of the slotted compartments. The waterproof component includes a rigid first casing, a second casing, a first waterproof sleeve, and a second waterproof sleeve. The first casing and the second casing are provided with connecting portions that cooperate with the connecting grooves. The first casing is assembled to the cover via the connecting portions, and the second casing is assembled to the base box via the connecting portions.

In the present application, the top surface of the box wall of the base box is provided with a raised edge, and the end of the raised edge is provided with extension parts that extend outward, forming a drainage structure.

In the present application, at least one guiding groove is also provided on the groove wall of the slotted compartments, and the first casing and the second casing are equipped with guiding blocks that cooperate with the guiding grooves.

In the present application, both the guiding grooves and the connecting grooves are arranged in an arc shape, and the first casing and the second casing are arc-shaped structures. When they are fastened together, they form a cylindrical structure.

In the present application, the base box is equipped with multiple protectors, sockets, and a panel for installing the sockets. Support blocks and locking blocks for connecting the panel are provided on the inner wall of the base box, and the locking blocks are positioned above the support blocks and abut against the top surface of the panel.

In the present application, the end of the support blocks is also provided with limiting blocks, and the bottom of the panel is equipped with raised portion that cooperate with the limiting blocks.

In the present application, the panel is also provided with multiple windows for observing protector indicator lights.

In the present application, the first casing and the second casing are equipped with multi-level inwardly protruding sealing walls, which are arc-shaped structures.

In the present application, the diameter of the sealing walls gradually increases from one end away from the base box to the end closer to the base box.

In the present application, the first casing and the second casing are equipped with three levels of sealing walls, which form a circular ring structure when the first casing and the second casing are fastened together.

In the present application, the first waterproof sleeve and the second waterproof sleeve are provided with limiting walls, and the limiting walls are equipped with insertion holes. The first casing and the second casing are provided with through-holes for the limiting walls to be inserted, and the first casing is also provided with protrusions that cooperate with the insertion holes. The first waterproof sleeve is connected to the first casing via the insertion holes and the protrusions.

Compared to the existing technology, the beneficial effects of the present application are as follows.

The housing of the outdoor power supply box in the present application only has slotted compartments and channels for accommodating cables. The overall sealing effect is excellent. Waterproof components and waterproof plugs are provided at the slotted compartments and channels, significantly enhancing the overall waterproof effect and ensuring reliable scaling performance of the power supply box when used outdoors.

BRIEF DESCRIPTION OF THE DRAWINGS

To provide a clearer explanation of the embodiments or technical solutions in the present application or prior art, a brief introduction will be given below regarding the drawings required for the description of the embodiments or prior art. It is evident that the drawings described below are merely some embodiments of the present application, and ordinary skilled persons in the field can obtain other drawings based on these drawings without exercising inventive labor.

DETAILED DESCRIPTION OF THE EMBODIMENTS

Figure 1:
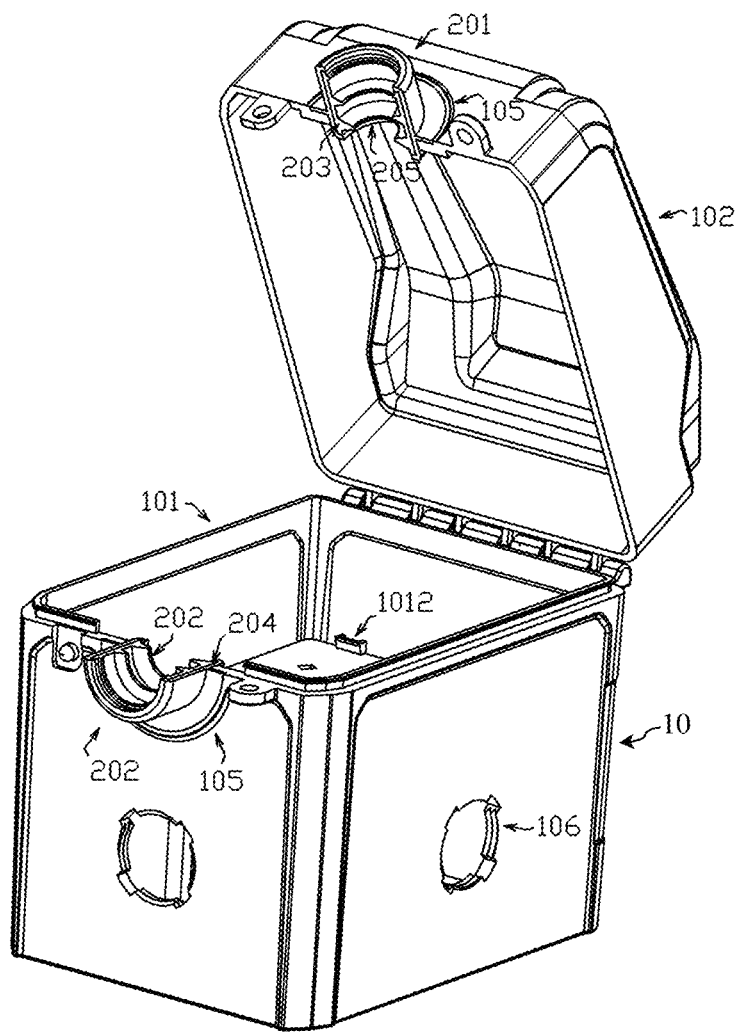
FIGS. 1-5 are schematic diagrams according to an embodiment.
Figure 2:
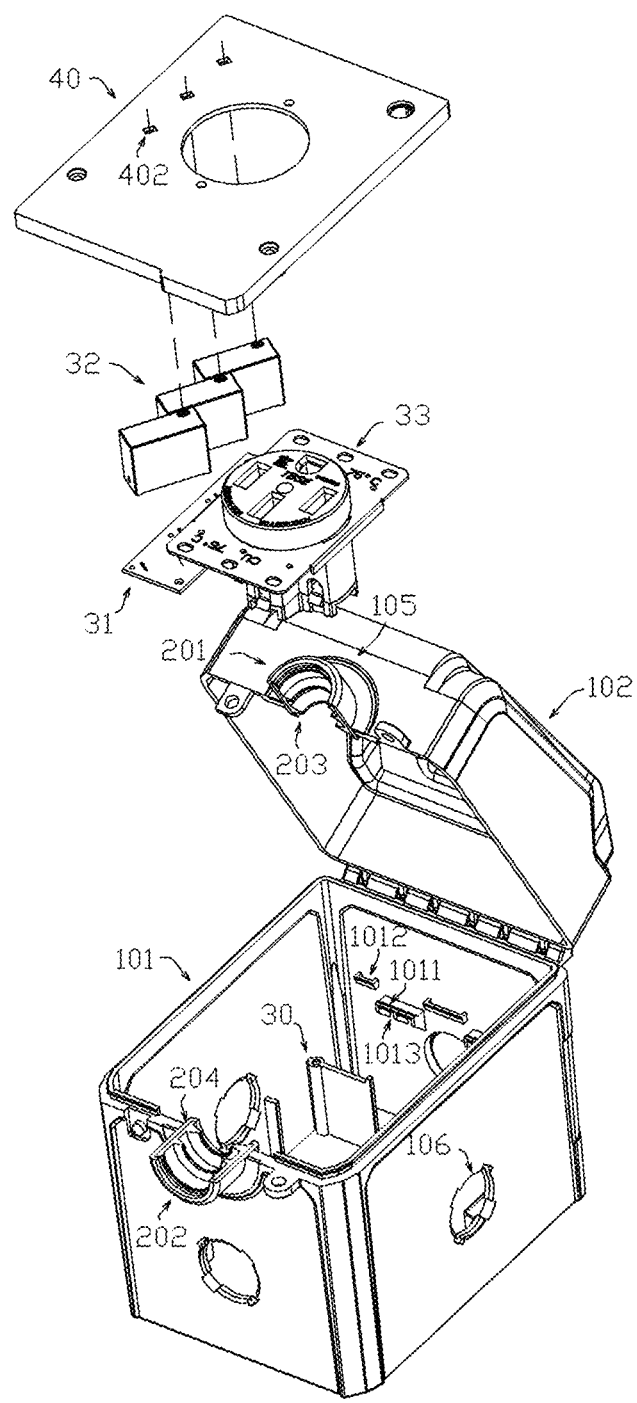

Compared to the embodiments shown in the accompanying drawings, the feasible embodiments within the scope of the present disclosure may have fewer components, additional components not shown in the drawings, different components, components arranged differently, or components connected differently. Furthermore, two or more components shown in the drawings can be implemented in a single component, or a single component shown in the drawings can be implemented as multiple separate components.

Unless otherwise defined, the technical or scientific terms used herein should be understood in their ordinary sense by a person skilled in the art of the field to which the application belongs. The terms "first," "second," and similar words used in the present application patent application and claims do not imply any order, quantity, or importance, but are merely used to distinguish different components. Similarly, words such as "one" or "a" do not necessarily indicate a numerical limitation. Words such as "including." "comprising." or "having" are intended to indicate that the elements or objects mentioned before the word encompass the elements or objects listed after the word, as well as their equivalents, and do not exclude other elements or objects. The terms "connection" or "communication" and similar words are not limited to physical or mechanical connections or communications shown in the drawings, but may include equivalent connections or communications, whether direct or indirect. The terms "up." "down," "left," "right." "horizontal," "vertical," and the like are used solely to indicate relative positional relationships, which may change accordingly when the absolute position of the described object changes.

The following description of the technical solutions of the present application will be clear and complete in conjunction with the embodiments. It is apparent that the described embodiments are only a part of the embodiments of the present application, rather than all embodiments. Based on the embodiments disclosed in the present application, all other embodiments that a person skilled in the art can obtain without inventive labor are within the scope of protection of the present application.

The outdoor power supply box shown in FIGS. 1-6 includes a housing 10, a panel 40 assembled inside the housing 10, sockets 33, and three protectors 32. Furthermore, it also includes a waterproof component 20 set on the front side of the housing 10. The housing 10 consists of a base box 101 with an open top and a cover 102 rotatably mounted on the top of the base box 101. The cover 102 covers the top of the base box 101, preventing insects, debris, and other contaminants from entering the housing 10 and causing pollution or damage to the power supply box.

Specifically, one side of the cover 102 is provided with a pivot 103, and the base box 101 is equipped with a connecting groove 104 that engages the pivot 103, allowing the cover 102 to rotate around the pivot 103. In the description, the side with the pivot 103 and the connecting groove 104 is referred to as the rear side.

On the front side of the housing 10, a detachable cavity for cable insertion is provided. The cavity is formed by two arc-shaped slots 105, which are located at the front connection between the base box 101 and the cover 102. When the base box 101 is fastened to the cover 102, the cavity is formed.

Specifically, three arc-shaped distributed locking slot 1052 and guiding grooves 1051 are provided on the groove walls of the two slots 105. After the housing 10 is fastened, the locking slot 1052 and guiding grooves 1051 of the two slots 105 form a circular structure distribution.

Figure 3:
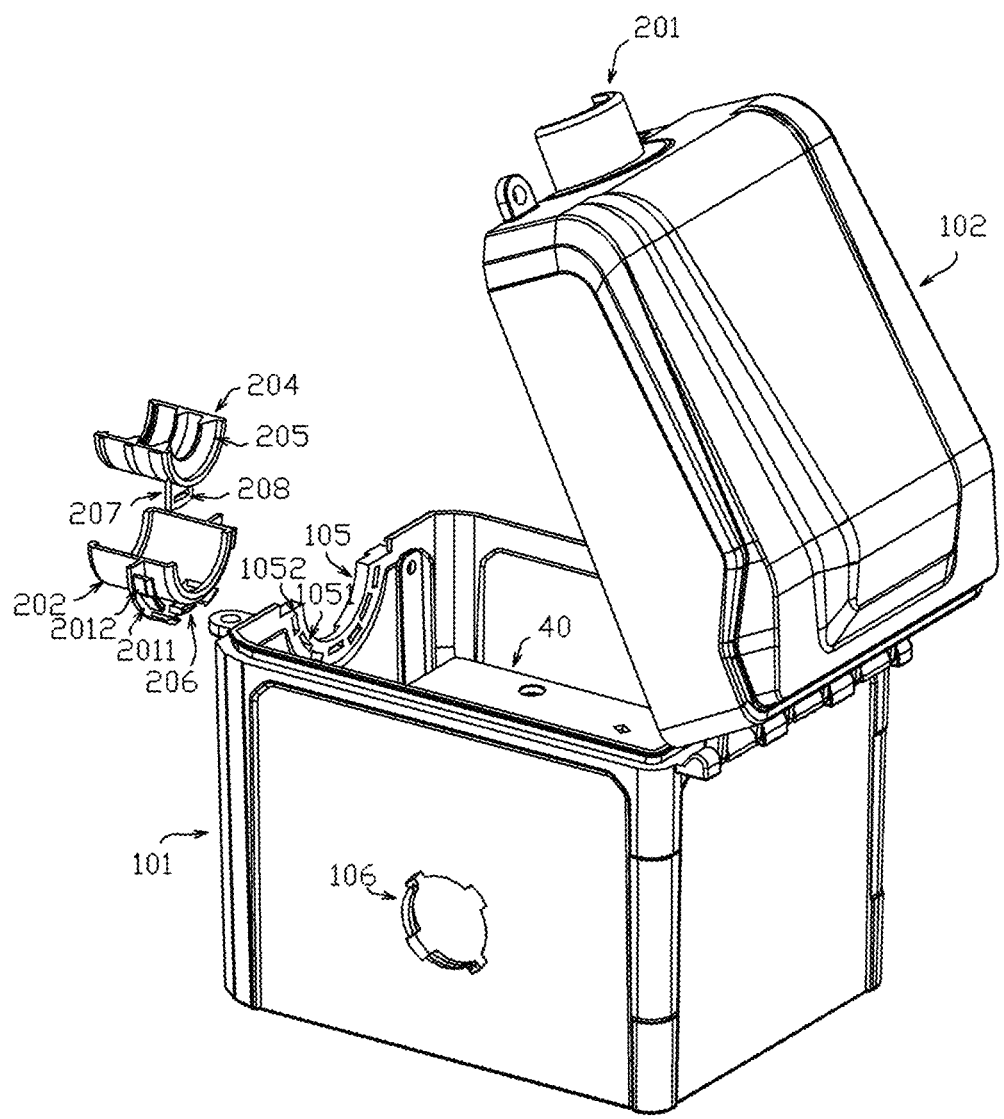
Figure 4:
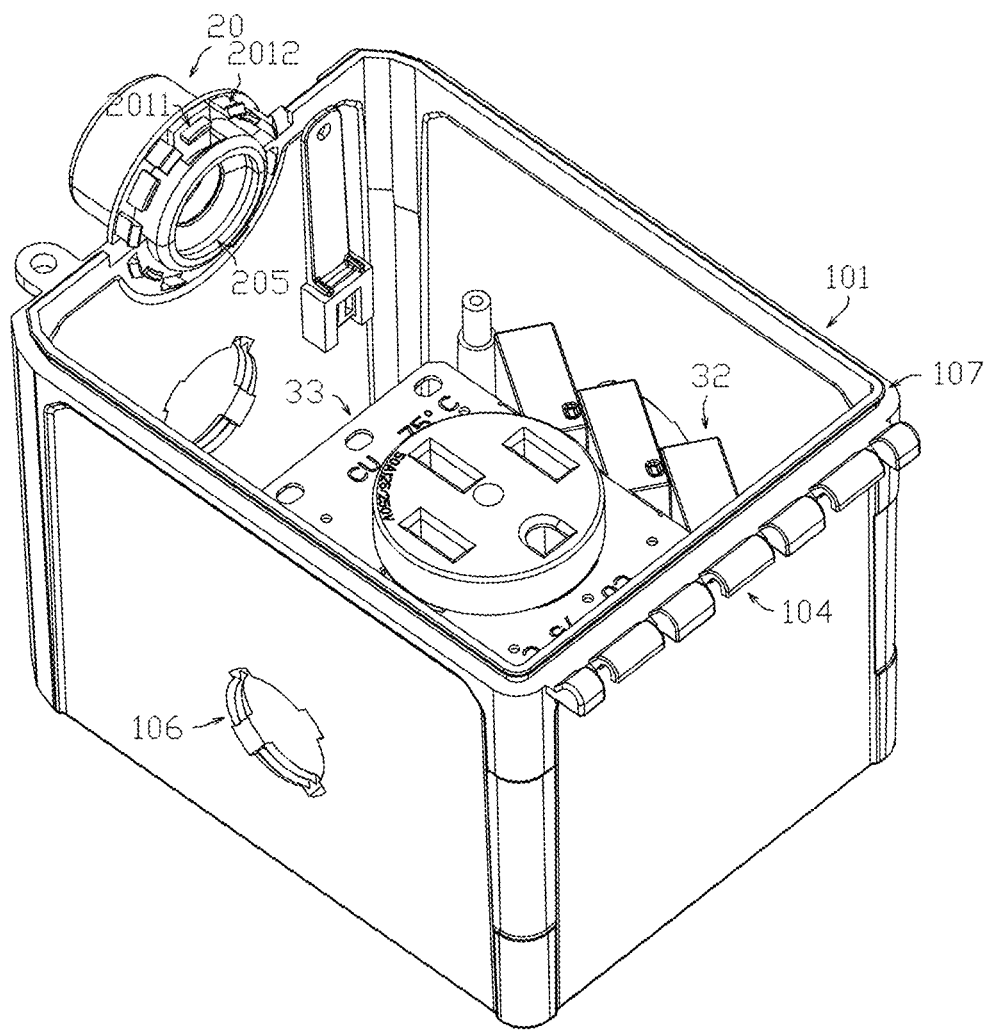
Figure 5:
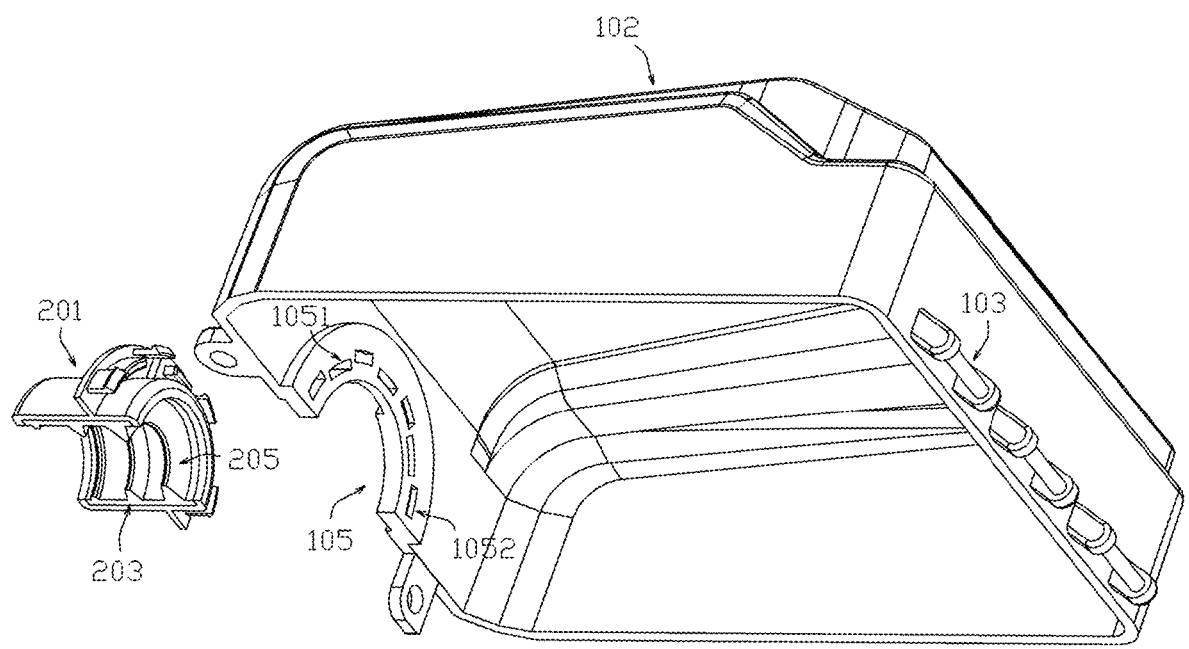
Figure 6:
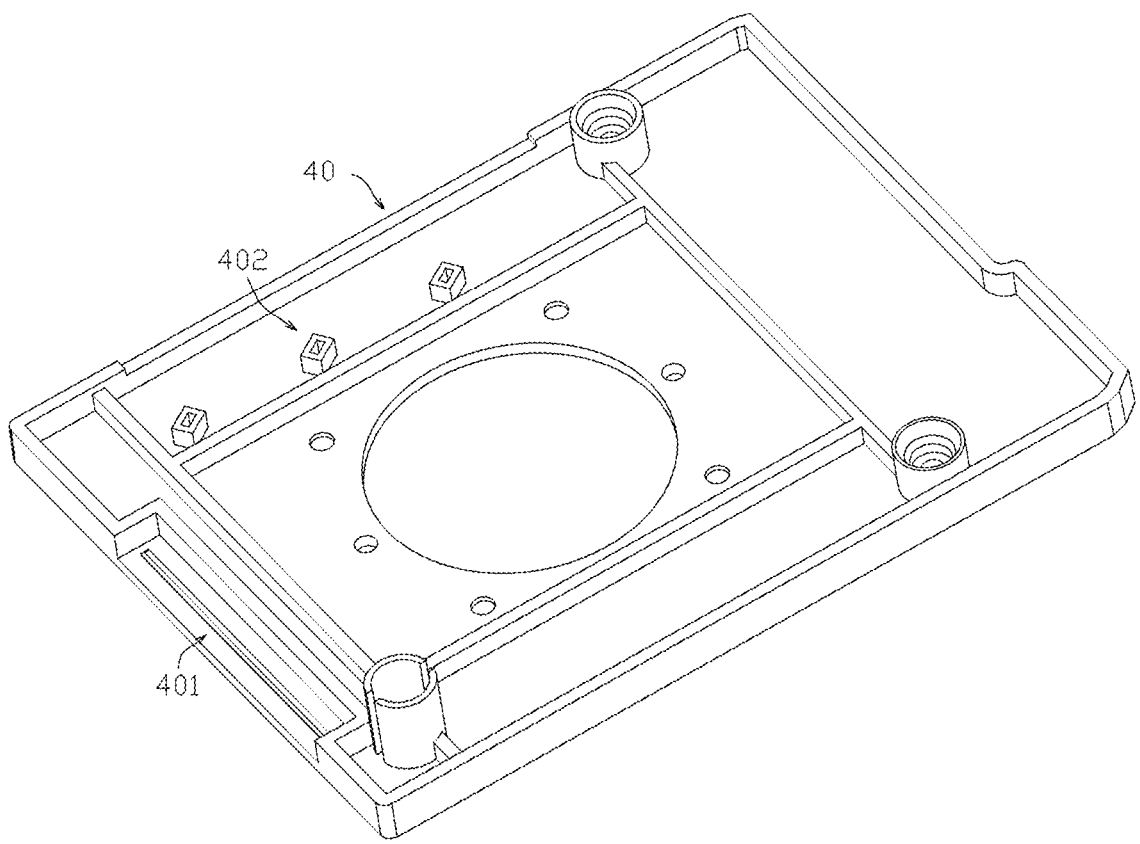
FIG. 6 is a schematic diagram of the panel.

Refer to FIGS. 3-4 for a detailed explanation of the waterproof component 20.

The waterproof component 20 includes a hard first casing 201, a second casing 202, a soft first waterproof sleeve 203, and a second waterproof sleeve 204. The first waterproof sleeve 203 is inserted into the first casing 201 and connected to the slot 105 of the base box 101, while the second waterproof sleeve 204 is mounted on the second casing 202 and connected to the slot 105 of the cover 102.

Both the first casing 201 and the second casing 202 are made of nylon, while the first waterproof sleeve 203 and the second waterproof sleeve 204 are made of polyurethane, rubber, or silicone material. As long as the first waterproof sleeve 203 and the second waterproof sleeve 204 are made of flexible material and have an interference fit with the cable, they can be used.

Multiple snap clasps 2012 (connection parts) that match the locking slot 1052 and guiding blocks 2011 that match the guiding groove 1051 are provided on the rear side of the first casing 201 and the second casing 202. The first casing 201 is inserted into the slot 105 of the cover 102 by matching the snap clasps 2012 with the locking slot 1052, and the second casing 202 is inserted into the slot 105 of the base box 101 by matching the snap clasps 2012 with the locking slot 1052.

It should be noted that in this embodiment, snap clasps and connecting slots are used for connection. However, as long as the first casing and the second casing can be detachably mounted on the housing and the cover, other forms of connection, such as bolts or rivets, can also be used.

The first casing 201, the second casing 202, the first waterproof sleeve 203, and the second waterproof sleeve 204 are all arc-shaped structures. When the housing 10 is fastened, the first casing 201 and the second casing 202 form a space for accommodating cables. The bottom of the first waterproof sleeve 203 and the second waterproof sleeve 204 are equipped with a downward-extending limiting wall 207. The first casing 201 and the second casing 202 are equipped with grooves and protrusions 206 that match the limiting wall 207, and the limiting wall 207 has an insertion hole for the protrusions 206.

When the limiting walls 207 of the first waterproof sleeve 203 pass through the slots, the protrusions 206 are inserted into the slots to complete the installation of the first waterproof sleeve 203. Multiple upward-extending sealing walls 205 are provided on the inner wall of the first waterproof sleeve 203, forming a concave surface. The sealing walls 205 are also arc-shaped structures that fit tightly around the cables, with the diameter of the sealing walls 205 gradually increasing from front to back.

Specifically, the first waterproof sleeve 203 has three sealing walls 205, with the frontmost sealing wall 205 being the shortest in length and radius, and the rearmost sealing wall 205 having the longest radius. The structure of the first waterproof sleeve 203 is the same as that of the second waterproof sleeve 204. When the housing 10 is fastened, the sealing walls 205 on the first waterproof sleeve 203 and the second waterproof sleeve 204 merge into multiple circular sealing walls 205, providing a better fit for cables of different radii and greatly increasing the overall sealing effect for better waterproofing.

Furthermore, within the base box 101, there are three protectors 32, installation plates 31 that support and fix the protectors 32, and supporting walls 30. The installation plates 31 are set between the two supporting walls 30, and the three protectors 32 are inclined on the installation plates 31, with sockets 33 set beside the protectors 32.

The inner wall of the base box 101 is equipped with supporting blocks 1011 and locking blocks 1012 for connecting the panel 40. The locking blocks 1012 are set above the supporting blocks 1011 and abut against the top surface of the panel 40. The end of the supporting blocks 1011 is also equipped with limiting blocks 1013, and the bottom of the panel 40 has raised portions 401 that correspond to and match the limiting blocks 1013.

The back of the bottom of the panel 40 abuts against the limiting blocks 1013, with the raised portions 401 locked by the limiting blocks 1013, and the locking blocks 1012 abut against the top of the panel 40 to prevent displacement. There are cable connection channels 106 on the front, left, and right sides of the base box 101, and waterproof connectors are also provided at the channels 106.

Preferably, the panel 40 also has multiple windows 402 for observing the indicator lights of the protectors 32. The sockets 33 are fixed to the bottom of the panel 40 with bolts, and the protectors 32 are set below the panel 40. The panel 40 has three windows 402 that align with the indicator light positions of the protectors 32, allowing direct observation of the indicator lights when the cover 102 is open.

Among them, the three protectors 32 are respectively leakage protector 32, overvoltage protector 32, and overcurrent protector 32, greatly increasing the safety of the power supply box. Users can directly observe the indicator light status of the protector 32 through window 402, which is highly reliable.

In particular, there are vertical raised edges 107 on the left and right side walls of the base box 101 and on the top surface of the front side wall. The top of the raised edge 107 is provided with an extension portion 108 extending outward (outside the cavity of the base box 101). The angle between the extension portion 108 and the raised edge 107 can be 30-90°. When water infiltrates into the base box 101 from the connection between the base box 101 and the cover 102, the extension portion 108 can effectively block the water and drain it out.

It should be noted that the raised edge 107 is set on the side closer to the opening of the base box 101, that is, the inner side of the side wall.

The above-described embodiments are merely descriptions of preferred embodiments of the present application and do not limit the conception and scope of the present application. Various modifications and improvements made by those skilled in the art to the technical solutions of the present application, without departing from the design concept of the present application, should fall within the protection scope of the present application. The technical content to be protected by the present application is all recorded in the claims.

What is claimed is:

1. An outdoor power supply box, comprising:
   a housing and a detachable waterproof component installed on a front side of the housing for connecting cables;
   wherein the housing comprises a base box and a cover that is rotatably installed on a top of the base box, fully enclosing the base box, and both front sides of the base box and the cover are provided with arc-shaped grooves combined to form a cavity for accommodating wires, and at least one connecting groove is provided on groove walls;
   the waterproof component comprises a rigid first casing, a second casing, a first waterproof sleeve, and a second waterproof sleeve, and the first casing and the second casing are provided with connecting portions that cooperate with the connecting grooves, the first casing is assembled with the cover through the connecting portions, and the second casing is assembled with the base box through the connecting portions.

2. The outdoor power supply box according to claim 1, wherein a top surface of the box wall of the base box is provided with a raised edge, and an end of the raised edge is provided with extension parts that extend outward, forming a drainage structure.

3. The outdoor power supply box according to claim 2, wherein at least one guiding groove is also provided on the groove wall of slotted compartments, and the first casing and the second casing are equipped with guiding blocks that cooperate with the guiding grooves.

4. The outdoor power supply box according to claim 3, wherein both the guiding grooves and the connecting grooves are arranged in an arc shape; the first casing and the second casing, which are arc-shaped structures, form a cylindrical structure when fastened together.

5. The outdoor power supply box according to claim 4, wherein the base box is equipped with multiple protectors, sockets, and a panel for installing the sockets, support blocks and locking blocks for connecting the panel are provided on an inner wall of the base box, and the locking blocks are positioned above the support blocks and abut against a top surface of the panel.

6. The outdoor power supply box according to claim 5, wherein an end of the support blocks is also provided with limiting blocks, and a bottom of the panel is equipped with a raised portion that cooperates with the limiting blocks.

7. The outdoor power supply box according to claim 5, wherein the panel is also provided with multiple windows for observing protector indicator lights.

8. The outdoor power supply box according to claim 1, wherein the first casing and the second casing are equipped with multi-level inwardly protruding sealing walls, which are arc-shaped structures.

9. The outdoor power supply box according to claim 8, wherein a diameter of the sealing walls gradually increases from one end away from the base box to an end closer to the base box.

10. The outdoor power supply box according to claim 9, wherein the first casing and the second casing are equipped with three levels of sealing walls, which form a circular ring structure when the first casing and the second casing are fastened together.

11. The outdoor power supply box according to claim 10, wherein the first waterproof sleeve and the second waterproof sleeve are provided with limiting walls, and the limiting walls are equipped with insertion holes; the first casing and the second casing are provided with through-holes for the limiting walls to be inserted, and the first casing is also provided with protrusions that cooperate with the insertion holes; the first waterproof sleeve is connected to the first casing via the insertion holes and the protrusions.

12. The outdoor power supply box according to claim 6, wherein the panel is also provided with multiple windows for observing protector indicator lights.

13. The outdoor power supply box according to claim 2, wherein the first casing and the second casing are equipped with multi-level inwardly protruding sealing walls, which are arc-shaped structures.

14. The outdoor power supply box according to claim 3, wherein the first casing and the second casing are equipped with multi-level inwardly protruding sealing walls, which are arc-shaped structures.

15. The outdoor power supply box according to claim 4, wherein the first casing and the second casing are equipped with multi-level inwardly protruding sealing walls, which are arc-shaped structures.

16. The outdoor power supply box according to claim 13, wherein a diameter of the sealing walls gradually increases from one end away from the base box to an end closer to the base box.

17. The outdoor power supply box according to claim 14, wherein a diameter of the sealing walls gradually increases from one end away from the base box to an end closer to the base box.

18. The outdoor power supply box according to claim 15, wherein a diameter of the sealing walls gradually increases from one end away from the base box to an end closer to the base box.

\* \* \* \* \*